United States Patent [19]

Frankhouse

[11] 4,238,107
[45] Dec. 9, 1980

[54] MOTION TRANSMITTING REMOTE CONTROL ASSEMBLY

[75] Inventor: Thomas J. Frankhouse, Southfield, Mich.

[73] Assignee: Teleflex Incorporated, Limerick, Pa.

[21] Appl. No.: 121,777

[22] Filed: Feb. 14, 1980

Related U.S. Application Data

[62] Division of Ser. No. 6,587, Jan. 26, 1979.

[51] Int. Cl.$^3$ .............................................. B29C 6/00
[52] U.S. Cl. ...................................... 249/83; 425/468
[58] Field of Search ............................ 249/83, 91, 92; 425/468, 95, 96, 97

[56] References Cited

U.S. PATENT DOCUMENTS

| | | | |
|---|---|---|---|
| 2,604,660 | 7/1952 | Karns | 249/91 X |
| 3,108,329 | 10/1963 | Chapman | 249/91 |
| 4,167,379 | 9/1979 | Leautaud | 249/83 X |

Primary Examiner—J. Howard Flint, Jr.
Attorney, Agent, or Firm—McGlynn and Milton

[57] ABSTRACT

A motion transmitting remote control assembly of the type for transmitting motion in a curved path by a flexible motion transmitting core element and the method and assembly for making same. A sleeve has a second end with a male swivel portion having a partial convex spherical surface. The convex spherical surface extends from its intersection with the circular exterior of the sleeve to a lip defined by the intersection of the surface with the bore in the sleeve at the second end of the sleeve. The end fitting includes a female swivel portion having a partial concave spherical surface for receiving and supporting the male swivel portion whereby the sleeve may pivot in different directions from a neutral position. The concave surface has a first extremity engaging the convex surface and is spaced from the intersection of the convex surface and the exterior of the sleeve when the sleeve is in the neutral position. The first extremity defines at least a part of the total extremity of the female swivel portion and the total extremity of the female swivel portion is in a single plane and extends continuously about the male swivel portion. A bore extends into the end fitting from the second extremity of the concave surface of the female swivel portion and has a radial dimension at least as great as the lip in the same radial direction.

3 Claims, 4 Drawing Figures

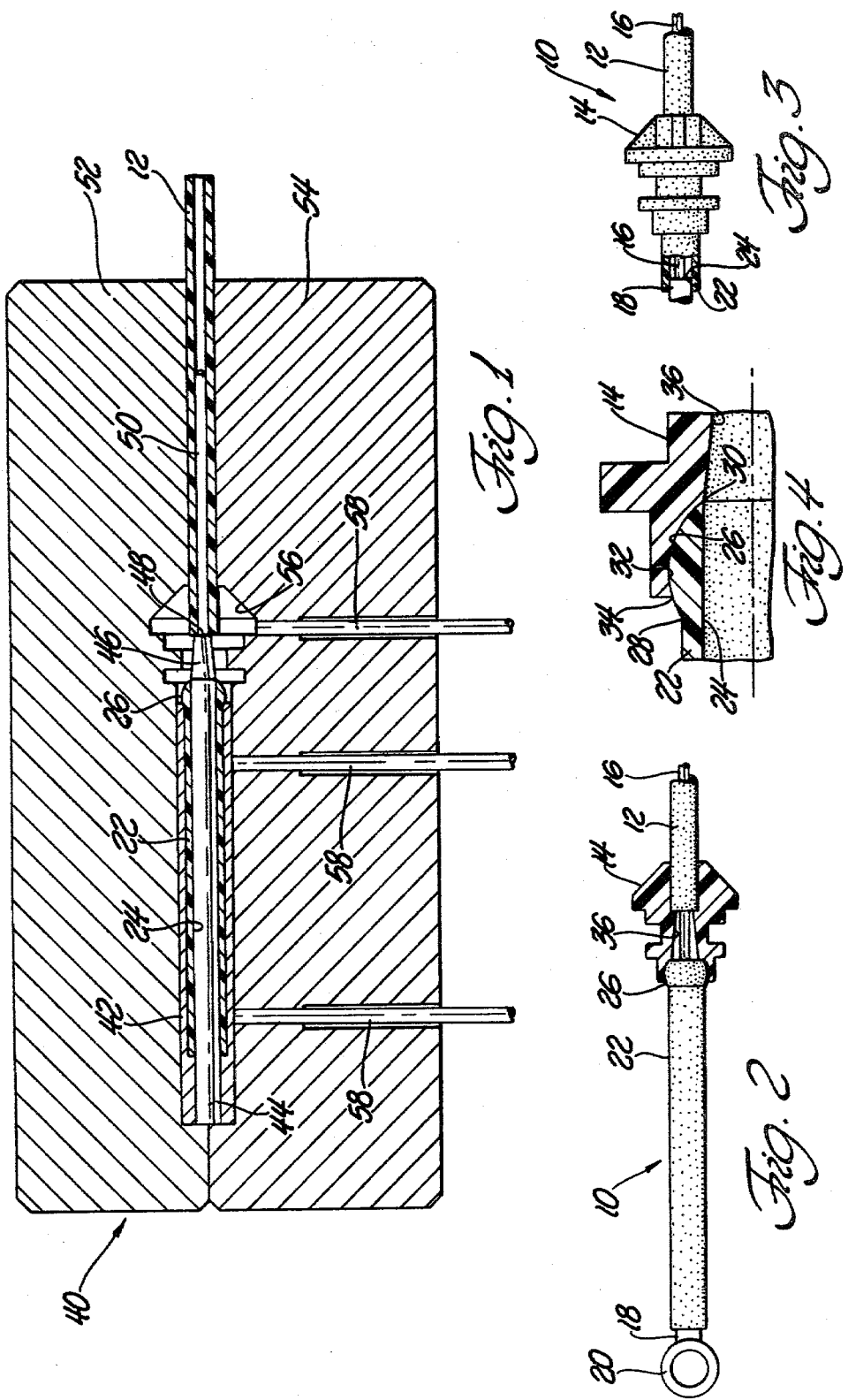

MOTION TRANSMITTING REMOTE CONTROL ASSEMBLY

This is a division, of application Ser. No. 6,587 filed Jan. 26, 1979.

BACKGROUND OF THE INVENTION

1. Field of the Invention

The subject invention relates to a motion transmitting remote control assembly of the type for transmitting motion in a curved or tortuous path by way of a flexible motion transmitting core element.

2. Description of the Prior Art

Motion transmitting remote control assemblies of the type to which the instant invention pertains were once known as Bowden cables. Bowden cables were, however, made entirely of metal and the state of the art has progressed significantly and most such motion transmitting remote control assemblies are now made of organic polymeric materials, i.e., plastic materials. Numerous such remote control assemblies include a conduit made of organic polymeric material with an end fitting of organic polymeric material molded about the end of the conduit with a motion transmitting wire-like core element movably disposed within the conduit and extending from the end fitting. Many such assemblies include a rod, frequently made of metal, attached to the end of the wire-like core element and being slidably supported in a sleeve, the sleeve in turn being connected to the end fitting through a ball joint with the rod extending from the end of the sleeve for connection to a member to be controlled. In some such assemblies the sleeve member has a male spherical ball at the end thereof disposed in a female spherical socket in the end of the end fitting. The parts are assembled together as the portion of the end fitting defining the female socket has slits or slots along the sides thereof to allow the pocket to open up as the male spherical portion of the sleeve is forced thereinto. In such assemblies, however, there is not a perfect mating between the male and female surfaces which therefore results in poor bearing loads between the surfaces. Further, it frequently occurs in such a system that the sleeve may be unsnapped easily from the end fitting. In addition, there are also tolerance problems associated with the system in that the tolerances must be maintained in order to attain the proper connection between the male and female swivel portions.

SUMMARY OF THE INVENTION

In accordance with the subject invention there is provided such a motion transmitting remote control assembly including a guide means for movably supporting a core element which is connected to a rod slidably disposed in a sleeve with the sleeve having a male swivel portion with a partial convex spherical surface which extends from its intersection with the exterior of the sleeve to a lip defined by the intersection thereof with a bore extending through the sleeve and with the guide means having a female swivel portion having a partial concave spherical surface for receiving and supporting the male swivel portion of the sleeve whereby the sleeve may pivot in different directions from a neutral position and with the concave surface having a first extremity engaging the convex surface and being spaced from the intersection of the convex surface and the exterior of the sleeve when the sleeve is in the neutral position and with that first extremity of the concave surface defining at least a part of the total extremity of the female swivel portion, which total extremity is in a single plane extending continuously about the male swivel portion and with a bore extending into the guide means from the second extremity of the concave surface of the female swivel portion and with the bore having a radial dimension at least as great as the lip in the radial direction of the lip. The invention also includes an assembly and a method for making the above remote control assembly by molding the female swivel portion completely about the male swivel portion of the sleeve.

PRIOR ART STATEMENT

As alluded to above, motion transmitting remote control assemblies are known in the prior art wherein the male swivel portion of the sleeve is forced into the female swivel portion of an end fitting by separating the opening into the female swivel portion as the male swivel portion is inserted thereinto. However, such assemblies are not entirely satisfactory in terms of bearing loads, tolerance problems and the propensity for being easily disconnected.

Other than the remote control assemblies made of plastic with the female swivel portion having slots so that it may expand to receive the male swivel portion of the sleeve, there are such assemblies made of metal and one such example is shown in U.S. Pat. No. 3,411,373 granted to G. M. Zieber et al on Nov. 19, 1968 and assigned to the assignee of the invention herein described. That patent discloses a remote control assembly wherein the sleeve is made of metal and has a metal male swivel portion disposed in a female swivel portion which is also made of metal and surrounds the male swivel portion. However, the configurations of the components are not suitable for such a motion transmitting remote control assembly made of organic polymeric or plastic material with the female swivel portion completely surrounding the male swivel portion as in the invention diclosed herein.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view showing a mold assembly for making the preferred embodiment of the motion transmitting remote control assembly;

FIG. 2 is a side elevational view partially in cross section showing a preferred embodiment of the motion transmitting remote control assembly of the subject invention;

FIG. 3 is a view similar to FIG. 2 and partially broken away and in cross-section; and FIG. 4 is an enlarged fragmentary cross-sectional view showing the connection between the male and female swivel portions in the preferred embodiment of the motion transmitting remote control assembly of the subject invention.

DESCRIPTION OF THE PREFERRED EMBODIMENT

A motion transmitting remote control assembly of the type for transmitting motion in a curved path by a flexible motion transmitting core element is generally shown at 10 in FIGS. 2 and 3.

The assembly 10 includes a guide means comprising a flexible conduit 12 and an end fitting 14. The fitting 14 is adapted to be connected to a support structure as by a bracket or as to be inserted in an aperture in a bulkhead, or the like. The conduit 12 is preferably made of an organic polymeric or plastic material and is of a well known construction including an inner tubular member surrounded by wires disposed helically about the inner tubular member on a long lead with an outer casing disposed about the long lay wires with the inner tubular member and the casing being of the organic polymeric or plastic material.

A wire-like motion transmitting core element 16 is movably supported by the conduit 12 as it extends through a central bore or opening of the conduit 12 and through the fitting 14 to a first end which projects from the fitting 14. The core element 16 is preferably made of a flexible wire. A metal rod 18 is attached to the end of the core element 16 which projects from the fitting 14. The metal rod 18 is preferably circular in cross section and includes a connector 20 for connection to a device to be moved or which moves the core element 16.

The assembly 10 includes a sleeve 22 of organic polymeric or plastic material. The sleeve 22 is circular in cross section and movably supports the rod 18 as the sleeve 22 has a bore 24 extending therethrough which surrounds the rod 18 for slidably supporting the rod. The rod 18 extends from a first end of the sleeve 22 and has the connector 20 disposed thereon. The sleeve 22 has a second end with a male swivel portion having a partial convex spherical surface 26. The convex spherical surface 26 extends from its intersection 28, as illustrated in FIG. 4, with the exterior surface of the sleeve 22 to a lip 30 which lip 30 is defined by the intersection of the spherical surface 26 with the bore 24 in the sleeve at the second end of the sleeve 22.

The fitting 14 of the guide means has a female swivel portion having a partial concave spherical surface 32 for receiving and supporting the male swivel portion whereby the sleeve 22 may pivot or swivel in different directions from a neutral position, which neutral position is shown in FIGS. 2 and 4. In the neutral position the axis of the sleeve 22 is aligned with the axis of the core element 16 as it extends through the fitting 14. The concave surface 32 has a first extremity 34 which engages the convex surface 26 at a position spaced from the intersection 28 of the convex surface 26 and the exterior surface of the sleeve 22 when the sleeve is in the neutral position illustrated in FIGS. 2 and 4. The first extremity 34 of the surface 32 defines a female swivel portion and that total extremity of the female swivel portion is in a single plane and extends continuously about the male swivel portion. In other words, the extremity of the end fitting 14 which is molded around the male swivel portion and the surface 26 thereof is in contiguous engagement with the male swivel portion completely about its periphery. As illustrated, both the male and female swivel portions are circular or annular as viewed in cross section. However, it will be appreciated that both the male and female swivel portions may have plain parallel sides extending between the partial spherical surfaces whereby the sleeve 22 will pivot only in a plane parallel to the two sides of the female and male swivel portions. In any case, the extremity of the female swivel portion is in continuous engagement with the male portion and there are no breaks therein as the female portion is molded completely about the male portion.

The fitting 14 of the guide means has a bore 36 extending thereinto from the second extremity of the concave surface 32 which is contiguous with the lip 30 and the male surface 26. Thus, the bore extends from the extremity of the concave surface 32 of the female swivel portion and the bore 36 has a radial dimension, or diameter as it is circular in the preferred embodiment, which is at least as great as the diameter of the lip 30 in the radial direction of the lip 30 from the longitudinal axis of the assembly, which lip is defined by the convex surface 26 and the bore 24 in the sleeve 22. In other words, the bore 36 in the area which is contiguous with the spherical surfaces 26 and 32 has a radial dimension which is not smaller than the radial dimension of the position of the lip 30. In the embodiment illustrated, the spherical surfaces 26 and 32 of the swivel portions extend annularly throughout 360°, however, as alluded to above, the spherical surfaces may extend less than 360° and be oppositely disposed and interconnected by parallel planes. The bore 36 in the fitting 14 is conical and tapers from a large diameter adjacent the lip 30 in a direction away from the juncture of the bore 36 with the concave surface 32 to a small diameter adjacent and abutting the end of the conduit 12.

An assembly for making the motion transmitting remote control assembly 10 is generally indicated at 40 in FIG. 1. the assembly 40 includes a first member comprising a tube 42 enclosing, surrounding and covering the exterior surface of the sleeve 22 and a portion of the convex spherical surface 26 which portion extends from the intersection 28 of the surface 26 with the exterior of the sleeve 22 while leaving the remainder of the convex surface 26 which extends to the lip 30 completely exposed. In other words, the tubular member 42 covers the portion of the spherical surface 26 illustrated in FIG. 4 which extends between the intersection 28 and the extremity 34.

The assembly 40 also includes a mandrel 44 which is inserted into the bore 24 of the sleeve 22 to plug the bore at the lip 30 to prevent entry of organic polymeric or plastic material into the bore 24 past the lip 30. The mandrel 44 has a first length with a constant circular cross section in diameter therealong up to a position disposed in a plane which contains the extremity of the lip 30 to plug the bore 24 in the sleeve 22. The mandrel also includes a second length 46 which is conical and tapers inwardly from the end of the first length of the mandrel 44 to a small diameter 48. The mandrel 44 also includes a nose section 50 which extends from the small diameter 48 of the conical portion 46 and is inserted into the conduit 12 placed within the assembly 40 for plugging the end of the conduit 12 to prevent the entry of material thereinto.

The assembly 40 includes two mold halves 52 and 54 which mate together and engage the exterior of the first tubular member 42 and define a cavity 56 spaced about the exposed remaining portion of the convex surface 26 and the conical portion 46 and the end of the conduit 12 for molding a fitting in the cavity 46 about the end of the conduit 12 and about the exposed portion of the convex surface 26 of the male swivel portion.

The assembly also includes ejector pins 58 for removing the part from the mold after organic polymeric material is injected into the cavity 56 and the mold parts 52 and 54 are separated.

Thus, in making the assembly, a portion of the convex surface 26 is enclosed and covered from the intersection 28 a distance up the surface 26 while leaving the remainder of the surface 26 extending to the lip 30 exposed. The bore 24 in the sleeve is plugged by the mandrel 44 contiguously with the lip 30 to prevent entry of material into the bore 24 past the lip.

The sleeve 22 is molded of organic polymeric or plastic material prior to being placed into the assembly 40 for molding the fitting 14 about the male swivel portion thereof. The sleeve 22 is placed within the tubular member 42 to cover the portion of the convex surface 26 and the exterior of the remaining portion of the sleeve 22 to prevent organic polymeric material injected into the cavity 56 from encasing the covered portion of the convex surface 26. The mandrel 44 is inserted into the bore 24 of the sleeve 22 to fill and plug the bore 24. The sleeve 22 is then placed in the mold with the male swivel portion disposed in the mold cavity 56 and in the position illustrated by inserting the nose portion 50 of the mandrel into the conduit 12 for plugging the opening in the conduit 12 to prevent the entry of material thereinto. Once the components are in the position illustrated in FIG. 1 organic polymeric material is injected into the cavity 56 for molding the fitting 14 about the male swivel portion and the exposed convex surface 26 thereof and to define the female concave spherical surface 32.

Preferably, the organic polymeric material injected into the cavity 56 is injected at a temperature such that the material will not stick to the plastic material defining the surface 26 on the sleeve 22. Alternatively, and in some instances, a mold release liquid or other liquid material may be sprayed or otherwise applied to the exposed plastic material of the sleeve 22 in the mold cavity 56 to prevent the plastic material injected into the cavity 56 from adhering or sticking to the sleeve 22. As will be appreciated, the fitting 14 is molded completely about the male swivel portion at the end of the sleeve 22 and is completely contiguous therewith so that there is an excellent fit providing excellent bearing leads and significantly reducing the tolerance problems and also making it much more difficult to remove the sleeve 22 from the fitting 14 as compared to the prior systems wherein the female socket is slotted so that it's entry could be opened relatively easily.

The invention has been described in an illustrative manner, and it is to be understood that the terminology which has been used is intended to be in the nature of words of description rather than of limitation.

Obviousy, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for making a motion transmitting remote control of the type including a conduit with an end fitting of organic polymeric material disposed on one end of the conduit and a motion transmitting core element extending through the conduit and end fitting with the core element connected to a rod movably supported in a bore in a sleeve having a male swivel portion with a partial convex spherical surface extending from by its intersection with the bore of the sleeve and pivotally supported in a female swivel portion having a partial concave spherical surface, said assembly comprising; a first member for enclosing and covering a portion of the convex spherical surface extending from the intersection thereof with the exterior of the sleeve while leaving the remainder of the convex surface extending to the lip exposed, a mandrel for insertion into the bore of the sleeve to plug the bore at the lip to prevent entry of material into the bore past the lip, and a mold having a portion surrounding and engaging the exterior of said first member and defining a cavity spaced about the exposed remainder portion of the convex surface for molding a fitting about the male swivel portion.

2. An assembly as set forth in claim 1 wherein said mandrel has a first length with a constant diameter therealong for plugging the bore in the sleeve and a second length which is conical and tapers inwardly from the end of said first length to a small diameter.

3. An assembly as set forth in claim 2 wherein said mandrel includes a nose section extending from said small diameter of said conical length for insertion into the conduit for plugging the conduit.

* * * * *